United States Patent
Yagura et al.

(10) Patent No.: US 9,162,576 B2
(45) Date of Patent: Oct. 20, 2015

(54) POWER SWITCHING APPARATUS

(75) Inventors: Hirofumi Yagura, Okazaki (JP); Jun Saito, Okazaki (JP); Takuma Maeda, Okazaki (JP); Hiroyuki Yashiro, Okazaki (JP); Naoki Kawashima, Okazaki (JP); Shigeharu Ishii, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 540 days.

(21) Appl. No.: 13/618,372

(22) Filed: Sep. 14, 2012

(65) Prior Publication Data

US 2013/0076124 A1  Mar. 28, 2013

(30) Foreign Application Priority Data

Sep. 27, 2011  (JP) .................. 2011-210308

(51) Int. Cl.
 *B60L 1/00* (2006.01)
 *B60L 1/04* (2006.01)
 *B60H 1/32* (2006.01)
 *B60H 1/00* (2006.01)

(52) U.S. Cl.
 CPC ............... *B60L 1/04* (2013.01); *B60H 1/00421* (2013.01); *B60H 1/32* (2013.01)

(58) Field of Classification Search
 CPC .......... B60L 1/04; B60L 1/00421; B60L 1/32
 USPC .................................................. 307/9.1, 10.1
 See application file for complete search history.

(56) References Cited

U.S. PATENT DOCUMENTS

| | | |
|---|---|---|
| 2008/0157724 A1 | 7/2008 | Fattal |
| 2010/0318250 A1 | 12/2010 | Mitsutani |
| 2012/0022744 A1 | 1/2012 | Endo |
| 2012/0038326 A1 | 2/2012 | Endo et al. |
| 2012/0049771 A1 | 3/2012 | Komatsu |

FOREIGN PATENT DOCUMENTS

| | | | | |
|---|---|---|---|---|
| CN | 101647170 A | 2/2010 | | |
| CN | 101803147 A | 8/2010 | | |
| JP | 2000-78701 A | 3/2000 | | |
| JP | 2000078701 A | * 3/2000 | ................ | B60L 1/00 |
| JP | 2001-63347 A | 3/2001 | | |
| WO | WO 2009/034872 A1 | 3/2009 | | |
| WO | WO 2010/116521 A1 | 10/2010 | | |
| WO | WO 2010/131352 A1 | 11/2010 | | |
| WO | WO 2011/030401 A1 | 3/2011 | | |

* cited by examiner

*Primary Examiner* — Daniel Cavallari
(74) *Attorney, Agent, or Firm* — Birch, Stewart, Kolasch & Birch, LLP

(57) ABSTRACT

A power switching apparatus, configured to switch a power supply source that is configured to supply an electric power to an air conditioner that is mounted on a vehicle that can receive a power supply from a plurality of power sources, includes: a selecting unit configured to select the power supply source during execution of pre-air conditioning in which an operation of the air conditioner is started before start of running of the vehicle; and a setting unit configured to set a power supply to be supplied from the power supply source that is selected by the selecting unit, to the air conditioner.

8 Claims, 3 Drawing Sheets

POWER SWITCHING APPARATUS

BACKGROUND OF THE INVENTION

The present invention relates to a power switching apparatus for switching power supply sources for a vehicle air conditioner that can receive a power supply from a plurality of power sources.

A vehicle air conditioner mounted on a vehicle has a pre-air conditioning function in which the operation of the air conditioner is started before start of running of the vehicle (for example, see JP-A-2000-078701). In order to operate the pre-air conditioning function, a supply power to the vehicle air conditioner must be stably ensured even during stopping of the vehicle. Therefore, the pre-air conditioning function is often mounted on an electric vehicle or plug-in hybrid vehicle (hereinafter, generally referred to as "electrically driven vehicle") which, even during stopping, can get an electric power from an external power source.

JP-A-2000-078701 discloses a technique in which pre-air conditioning is efficiently performed to make the cabin comfortable at start of running, and to suppress power consumption of a battery during running. More specifically, an operation signal output from a charger mounted on the vehicle (vehicle charger), and a pre-air conditioning switch are checked to determine whether the vehicle charger is performing the charging operation or not, and further determine the charging power. If the vehicle charger is performing the charging operation and pre-air conditioning is selected, pre-air conditioning is performed. When pre-air conditioning is to be performed, determination is made on the charging power, and the air conditioning ability which is set in accordance with the charging power is selected. This enables pre-air conditioning to be performed in preference to charging of a battery. Even when the charging power is low, therefore, pre-air conditioning is performed without consuming the power in the battery.

In the above-described related art, however, there is a problem in that the user cannot select a power supply source for an electric power to the vehicle air conditioner in the operation of pre-air conditioning. In a vehicle air conditioner of the current status of the art, in a state where a charging cable is connected to a charging port of a vehicle, only an external power source is used as a power supply source for the vehicle air conditioner in the operation of pre-air conditioning, and, in a state where the charging cable is not connected to the charging port, only the electric power in a battery mounted on the vehicle (vehicle battery) is used. In the current status, means for enabling the user to control the power supply source for a vehicle air conditioner is limited to connection of a charging cable. Therefore, the present art cannot comply with various needs for the pre-air conditioning function.

When pre-air conditioning is operated by using only an external power source, for example, the air conditioning ability of a vehicle air conditioner is limited, and therefore air conditioning is insufficiently performed when the temperature is extremely high or low. Consequently, there seems to be a need for, when the temperature is extremely high or low, ensuring a sufficient air conditioning ability by using the power in a vehicle battery. Moreover, there seems to be another need for enabling the vehicle battery to be charged by low-cost nighttime electric power, and using the charging power in pre-air conditioning to reduce the running cost of a vehicle. In the current status, these needs cannot be satisfied on the side of a vehicle air conditioner, and are satisfied by, for example, user's manual operations of connecting and disconnecting a charging cable.

SUMMARY

This invention provides a power switching apparatus in which a power supply source to a vehicle air conditioner in an operation of pre-air conditioning can be arbitrarily set, and the convenience of the pre-air conditioning function can be further enhanced.

An aspect of the invention provides a power switching apparatus, configured to switch a power supply source that is configured to supply an electric power to an air conditioner that is mounted on a vehicle that can receive a power supply from a plurality of power sources, the power switching apparatus comprising: a selecting section configured to select the power supply source during execution of pre-air conditioning in which an operation of the air conditioner is started before start of running of the vehicle; and a setting section configured to set a power supply to be supplied from the power supply source that is selected by the selecting section, to the air conditioner.

The vehicle can run by using an electric power stored in a battery, which is mounted on the vehicle, for driving, as a source of power, the plurality of power sources may include an external power source which can perform the power supply from an outside of the vehicle, and the battery, and the selecting section may select at least one of the external power source and the vehicle battery, as the power supply source.

In a case where the battery only is selected as the power supply source, the setting section may perform setting in a following manner: when a remaining power amount in the battery is equal to or smaller than a first reference value, the power supply to the air conditioner is not performed; when the remaining power amount is equal to or larger than a second reference value that is larger than the first reference value, a power amount corresponding to a maximum output power amount of the air conditioner is supplied from the battery; or, when the remaining power amount is larger than the first reference value and smaller than the second reference value, a power amount to be supplied from the battery is changed in proportion to the remaining power amount.

In a case where both the external power source and the battery are selected as the power supply source, the setting section may set a power amount to be supplied from the external power source and a power amount to be supplied from the battery, based on a remaining power amount in the battery.

The setting section may perform setting in a following manner: a sum of the power amount to be supplied from the external power source and the power amount to be supplied from the battery has a constant value; and, when the remaining power amount is equal to or smaller than a third reference value, the power supply to the air conditioner is performed by the eternal power source only; when the remaining power amount is equal to or larger than a fourth reference value that is larger than the third reference value, a predetermined power amount is supplied from the battery, and a difference of the constant value and the predetermined power amount is supplied from the external power source; or, when the remaining power amount is larger than the third reference value and smaller than the fourth reference value, the power amount to be supplied from the battery is changed in proportion to the remaining power amount, and a difference of the constant value and the power amount to be supplied from the battery is supplied from the external power source.

The setting section may change the fourth reference value and the predetermined power amount, based on an outside air temperature in a vicinity of the vehicle.

In a case where the outside air temperature is equal to or higher than a first reference temperature, or is equal to or lower than a second reference temperature which is lower than the first reference temperature, the setting section may make the fourth reference value smaller than a value in another temperature zone, and the predetermined power amount larger than a value in the another temperature zone.

The power switching apparatus may further comprise an acquiring section configured to acquire information related to a suppliable power amount of each of the power sources. The setting section may determine whether the power supply source selected by the selecting section can perform the power supply or not, based on the information, and, if it is determined that the selected power supply source cannot perform the power supply, may change the power supply source, based on the information.

DETAILED DESCRIPTION OF EMBODIMENTS

Hereinafter, a preferred embodiment of the power switching apparatus of the invention will be described in detail with reference to the accompanying drawings.

Embodiment

Figure 1:
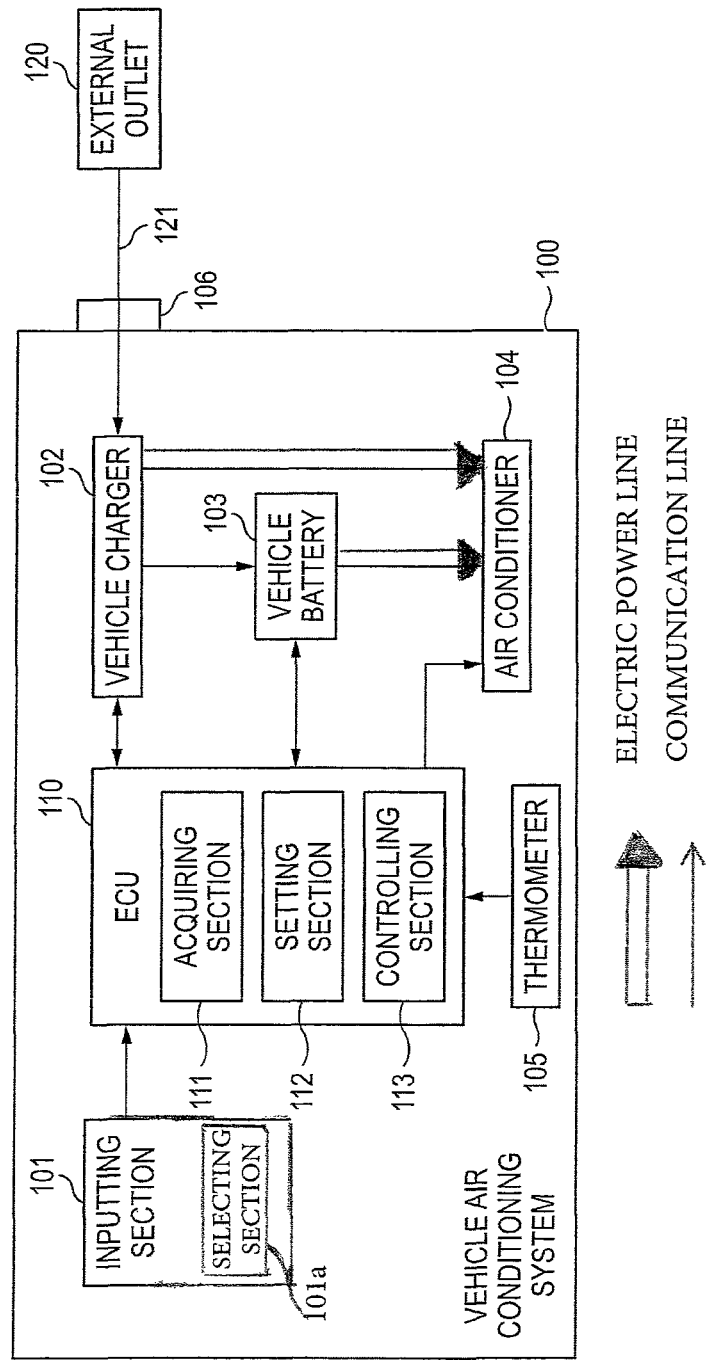
FIG. 1 is a block diagram showing the configuration of a vehicle air conditioning system 100 of an embodiment.

FIG. 1 is a block diagram showing the configuration of a vehicle air conditioning system 100 of an embodiment. The vehicle air conditioning system 100 is mounted on a vehicle, and controls air conditioning of the interior of the vehicle by means of an air conditioner 104. The vehicle on which the vehicle air conditioning system 100 is mounted is an electrically driven vehicle. Therefore, two systems, which are an external power source supplied through an external outlet 120 and a battery 103 mounted on the vehicle (vehicle battery 103), can be used as power supply sources (power sources) for the air conditioner 104. The embodiment describes a control for switching the power supply sources in the case where a pre-air conditioning function of the air conditioner 104 is operated, by using the vehicle air conditioning system 100. Hereinafter, the power supplied from the external power source is referred to as "external power", and that supplied from the vehicle battery 103 is referred to as "battery stored power".

The vehicle air conditioning system 100 includes an inputting section 101, a charger 102 mounted on the vehicle (vehicle charger 102), the vehicle battery 103, the air conditioner 104, a thermometer 105, a charging port 106, and an ECU 110. The ECU 110 includes an acquiring section 111, a setting section 112, and a controlling section 113.

The inputting section 101 receives setting inputs to the vehicle air conditioning system 100. As the inputting section 101, for example, a remote controller, a touch panel, setting buttons or dials, or the like which are disposed inside the vehicle may be used.

The setting inputs to the inputting section 101 include selection of the power supply source for the air conditioner 104 in the operation of pre-air conditioning. Namely, the inputting section 101 has a function of a selecting section 101a which selects the power supply source for the air conditioner 104 in the operation of pre-air conditioning. As described above, the external power source and the vehicle battery 103 can be used as the power supply source for the air conditioner 104. As the power supply source for the air conditioner 104 in the pre-air conditioning, the inputting section 101 can select either of three patterns, i.e., 1. the external power source only is used, 2. the vehicle battery 103 only is used, and 3. both the external power source and the vehicle battery 103 are used.

The vehicle charger 102 supplies the external power supplied through the charging port 106, to the vehicle battery 103, thereby charging the vehicle battery 103 with the power. When the supply destination of the external power is switched over, the vehicle charger 102 can directly supply the external power to the air conditioner 104. Moreover, the vehicle charger 102 can adequately distribute the power amount of the external power to simultaneously supply the power to the vehicle battery 103 and the air conditioner 104. Based on the control by the ECU 110, the vehicle charger 102 performs the switching of the supply destination of the external power, and the distribution of the supply power amount.

The vehicle charger 102 detects connection/disconnection of a charging cable 121 to/from the charging port 106, and sends information indicative of this to the ECU 110. In the embodiment, it is determined whether the external power can be used or not, based on the connection/disconnection of the charging cable 121 to/from the charging port 106. Namely, if the charging cable 121 is connected to the charging port 106, it is determined that the external power can be used, and, if the charging cable 121 is not connected to the charging port 106, it is determined that the external power cannot be used.

The vehicle battery 103 stores the power supplied from the vehicle charger 102. The vehicle battery 103 further stores the power which is generated by an alternator, during running of the vehicle. The power stored in the vehicle battery 103 is used as the power for operating the air conditioner 104, and for other purposes such as running of the vehicle on which the vehicle air conditioning system 100 is mounted. When a request for transmission of remaining power amount information in the vehicle battery 103 is issued from the ECU 110, the vehicle battery 103 detects the remaining power amount in the battery, and transmits the remaining power amount information to the ECU 110.

The air conditioner 104 adjusts the air in the vehicle to a preset state. More specifically, the air conditioner 104 sucks the air in the vehicle, and exhausts the air in which the temperature, the humidity, and the like have been adjusted, to the interior of the vehicle, thereby adjusting the temperature, the humidity, and the like of the interior of the vehicle so as to match the user's setting. The setting of air conditioning on the air conditioner 104 is performed by using, for example, the inputting section 101.

The air conditioner 104 has a pre-air conditioning function in which the operation of the air conditioner is started before start of running of the vehicle. When the pre-air conditioning function is to be used, the user inputs the start time of operation of the air conditioner 104 (or the scheduled time of boarding the vehicle), a set temperature, and the like through the inputting section 101. At the set operation start time (or an operation start time which allows the temperature in the vehicle to reach the set temperature until the scheduled time of boarding the vehicle), the air conditioner 104 starts to operate, and performs air conditioning so that the interior of the vehicle is at the set temperature.

The thermometer 105 measures the outside air temperature in the vicinity of the vehicle, and supplies the value of the measured temperature to the ECU 110.

The charging port 106 is an interface for supplying the external power, and connected to a connector (not shown) of the charging cable 121 so that the external power is supplied to the port through the external outlet 120.

The ECU 110 includes a CPU, a ROM which stores control programs and the like, a RAM which functions as a working area for the control programs, an EEPROM which rewritably holds various data, an interface section which interfaces with peripheral circuits and the like, etc.

The ECU 110 is connected to the inputting section 101, the vehicle charger 102, the vehicle battery 103, the air conditioner 104, and the thermometer 105 through the interface section, to communicate information between them, thereby governing the controls of them. When the CPU executes the control programs, furthermore, the ECU 110 realizes the acquiring section 111, the setting section 112, and the controlling section 113.

The acquiring section 111 acquires suppliable power amount information of each of the power sources, i.e., the external power source and the vehicle battery 103. The suppliable power amount information is information indicative of the status of the supply of the external power from the vehicle charger 102, such as connection/disconnection of the charging cable 121, and the suppliable power amount. The acquiring section 111 further acquires the remaining power amount information of the vehicle battery 103. For example, the remaining power amount information of the vehicle battery 103 is acquired by a process in which a signal for requesting the remaining power amount information is transmitted to the vehicle battery 103, and the remaining power amount information that is transmitted in response to this from the vehicle battery 103 is received. The remaining power amount in the vehicle battery 103 may be calculated by the acquiring section 111 from the difference between the power amount supplied to the vehicle battery 103 and the power amount discharged from the vehicle battery 103.

The setting section 112 sets a supply power amount (power supply) to be supplied from the power supply source which is selected in the inputting section 101, to the air conditioner. In the case where the external power source is selected as the power supply source in the inputting section 101, for example, the setting section 112 sets the external power source as the power supply source, in the case where the vehicle battery 103 is selected as the power supply source, the vehicle battery 103 as the power supply source, and, in the case where both the external power source and the vehicle battery 103 are selected as the power supply source, the both as the power supply source. The power amount to be supplied from each power supply source to the air conditioner 104 is set.

By contrast, the setting section 112 determines whether the power supply source selected in the inputting section 101 can supply the power or not, by using the suppliable power amount information acquired in the acquiring section 111. If it is determined that the power supply source selected in the inputting section 101 cannot supply the power, the setting section changes the power supply source based on the suppliable power amount information.

Specifically, in the case where the external power source only is selected as the power supply source, the setting section 112 determines whether the charging cable 121 is connected to the charging port 106 or not. If the charging cable 121 is connected to the charging port 106, the setting section 112 sets the external power source as the power supply source for the air conditioner 104. By contrast, if the external power source cannot supply the power, the vehicle battery 103 is set as the power supply source for the air conditioner 104.

In the case where the vehicle battery 103 only is selected as the power supply source, the setting section 112 determines whether the remaining power amount in the vehicle battery 103 is equal to or larger than a predetermined amount or not. If the remaining power amount in the vehicle battery 103 is equal to or larger than the predetermined amount, the setting section sets the vehicle battery 103 as the power supply source for the air conditioner 104, and, if the remaining power amount in the vehicle battery 103 is less than the predetermined amount, the setting section sets the external power source as the power supply source for the air conditioner 104.

In the case where both the external power source and the vehicle battery 103 are selected as the power supply source, the setting section 112 sets a ratio of the supply power amounts of the external power source and the vehicle battery 103, based on the remaining power amount in the vehicle battery 103.

The above-described process is a process which is to be performed in the case where both the external power source and the vehicle battery 103 can be used as the power source. In the case where one of them cannot be used, this does not apply.

The controlling section 113 controls the external power source and the vehicle battery 103 based on the setting in the setting section 112. More specifically, the controlling section 113 outputs control signals for the vehicle charger 102 and the vehicle battery 103 to control the power supply source and the supply power amount for the air conditioner 104.

Figure 2:
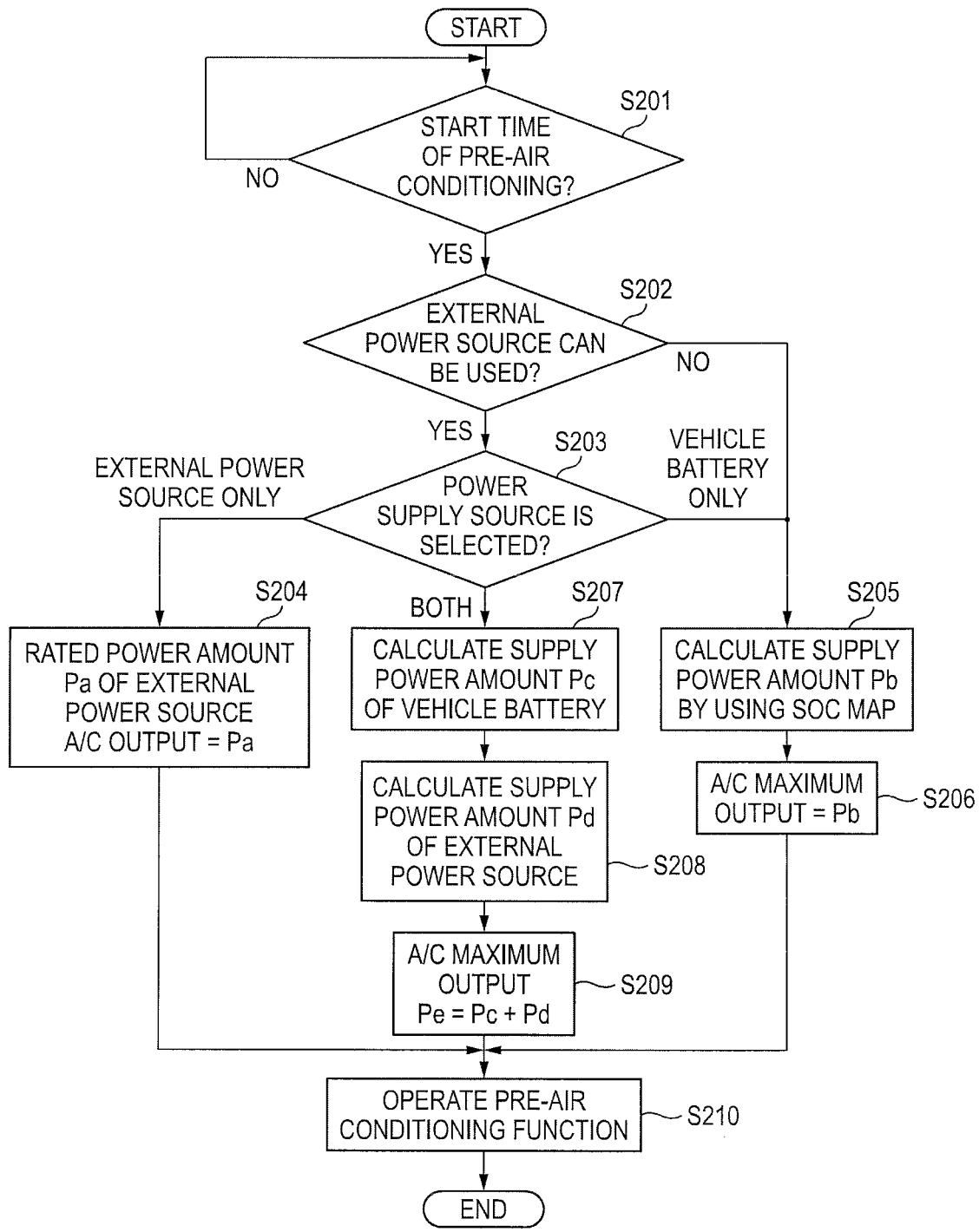
FIG. 2 is a flowchart showing a process at starting of an operation of a pre-air conditioning function by the vehicle air conditioning system 100.

FIG. 2 is a flowchart showing a process at starting of the operation of the pre-air conditioning function by the vehicle air conditioning system 100. In advance of the process of the flowchart of FIG. 2, the user previously inputs selections or settings of the power supply source in pre-air conditioning, the start time and set temperature of the operation of the pre-air conditioning function, and the like, through the inputting section 101.

In the flowchart of FIG. 2, the vehicle air conditioning system 100 waits until the start time of the pre-air conditioning (step S201: NO loop). At the start time of the pre-air conditioning (step S201: YES), the vehicle air conditioning system 100 first determines whether the external power source can be used or not (step S202). For example, the availableness of the external power source is determined on whether the charging cable 121 is connected to the charging port 106 or not.

If the external power source cannot be used (step S202: NO), the power must be supplied from the vehicle battery 103, and therefore the control is transferred to step S205.

By contrast, if the external power source can be used (step S202: YES), the vehicle air conditioning system 100 determines which one of: the external power source only; the vehicle battery 103 only; and both the external power source and the vehicle battery 103 are selected (step S203). In the case where the power supply source for the air conditioner 104 in the pre-air conditioning is not selected, it is assumed that both the external power source and the vehicle battery 103 are selected.

If the external power source only is selected as the power supply source for the air conditioner 104 in the pre-air conditioning (step S203: EXTERNAL POWER SOURCE ONLY), it is determined that the vehicle air conditioning system 100 uses the external power source only as the power source, and the rated power amount Pa of the external power source is set as the output (A/C output) to the air conditioner 104 (step S204).

If the vehicle battery 103 only is selected as the power supply source for the air conditioner 104 in the pre-air conditioning (step S203: VEHICLE BATTERY ONLY), the vehicle air conditioning system 100 calculates the supply power amount Pb to be supplied to the air conditioner 104, from an SOC (State of Charge: remaining power amount) map shown in FIG. 3 (step S205), and sets the calculated power Pb as the maximum output power to the air conditioner 104 (step S206).

Figure 3:
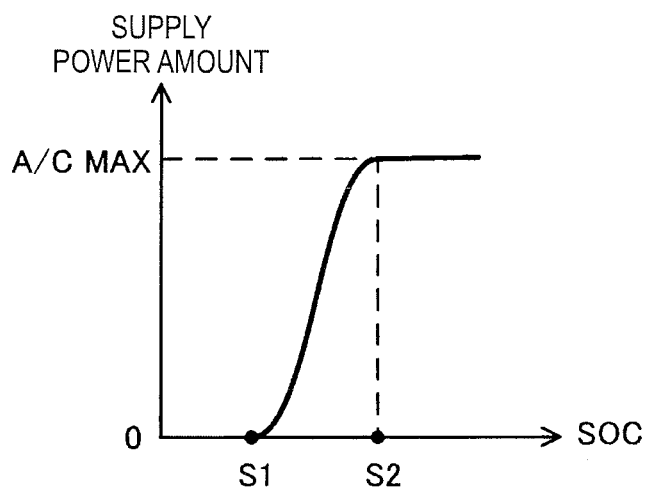
FIG. 3 is a graph showing an example of the SOC map of a vehicle battery 103 in the case where the vehicle battery 103 only is used as a power supply source.

FIG. 3 is a graph showing an example of the SOC map of the vehicle battery 103 in the case where the vehicle battery 103 only is used as the power supply source. In FIG. 3, the abscissa indicates the remaining power amount (SOC) in the vehicle battery 103, and the ordinate indicates the power amount supplied to the air conditioner 104. Furthermore, S1 (first reference value) and S2 (second reference value) indicate respectively thresholds which are determined from the storage capacity of the vehicle battery 103, and S1<S2. In the case where the remaining power amount in the vehicle battery 103 is equal to or smaller than S1, the supply power amount Pb for the air conditioner 104 is set to Pb=0, that is, the pre-air conditioning is not performed. This is because the remaining power amount in the vehicle battery 103 is so small that, when the pre-air conditioning is performed, battery exhaustion or the like maybe caused. When an allowance of use of the external power source in the case where the remaining power amount in the vehicle battery 103 is equal to or smaller than S1 is previously made by the user, the pre-air conditioning may be performed while using the external power source in place of the vehicle battery 103. In this case, the setting section 112 performs setting in a similar manner as step S204.

In the case where the remaining power amount in the vehicle battery 103 is equal to or larger than S2, i.e., the remaining power amount in the vehicle battery 103 can be sufficiently ensured, the supply power amount Pb for the air conditioner 104 is set to Pb=the maximum output power (A/C Max) of the air conditioner 104. In the case where the remaining power amount in the vehicle battery 103 is larger than S1 and smaller than S2, the supply power amount Pb for the air conditioner 104 is changed in proportion to the remaining power amount.

Returning to the description of FIG. 2, if both the external power source and the vehicle battery 103 are selected as the power supply source for the air conditioner 104 in the pre-air conditioning (step S203: BOTH), the vehicle air conditioning system 100 first calculates a supply power amount Pc to be supplied from the vehicle battery 103 to the air conditioner 104, by using an SOC map shown in FIG. 4 and a reference setting map shown in FIG. 5 (step S207).

Figure 4:
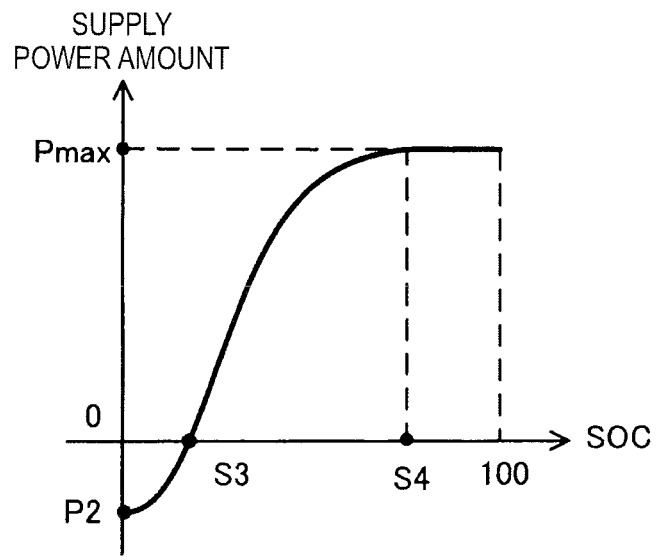
FIG. 4 is a graph showing an example of the SOC map of the vehicle battery 103 in the case where both an external electric power and the vehicle battery are used as a power supply source.

FIG. 4 is a graph showing an example of the SOC map of the vehicle battery in the case where both the external electric power and the vehicle battery 103 are used as the power supply source. In FIG. 4, the abscissa indicates the remaining power amount in the vehicle battery 103, and the ordinate indicates the supply power amount of the vehicle battery 103. When the supply power amount is positive, it is the supply power amount for the air conditioner 104, and, when negative, it is a charging power amount from the external power source. Furthermore, S3 (third reference value) and S4 (fourth reference value) indicate respectively thresholds which are determined from the storage capacity of the vehicle battery 103, and S3<S4.

In the case where the remaining power amount in the vehicle battery 103 is larger than S3 and smaller than S4, the supply power amount Pc for the air conditioner 104 is changed in proportion to the remaining power amount.

In the case where the remaining power amount in the vehicle battery 103 is equal to or smaller than S3, the remaining power amount in the vehicle battery 103 is excessively small, and therefore the power supply from the vehicle battery 103 to the air conditioner 104 is not performed. The power required in the air conditioner 104 is supplied from the external power source. Moreover, charging power is supplied from the external power source to the vehicle battery 103. The supply of the charging power is performed in preference to that of the power to the air conditioner 104. When the charging power amount in the case where the remaining power amount in the vehicle battery 103 is 0 is indicated by P2, |P2| means a power amount which is sufficient for restoring the stored power in the vehicle battery 103.

In the case where the remaining power amount in the vehicle battery 103 is equal to or larger than S4, the remaining power amount in the vehicle battery 103 is sufficiently ensured, and therefore a predetermined maximum power amount Pmax is supplied from the vehicle battery 103 to the air conditioner. Here, the threshold S4 of the remaining power amount and the maximum power amount Pmax are values which are changed in accordance with the outside air temperature in the vicinity of the vehicle, and determined by using the reference setting map shown in FIG. 5.

Figure 5:
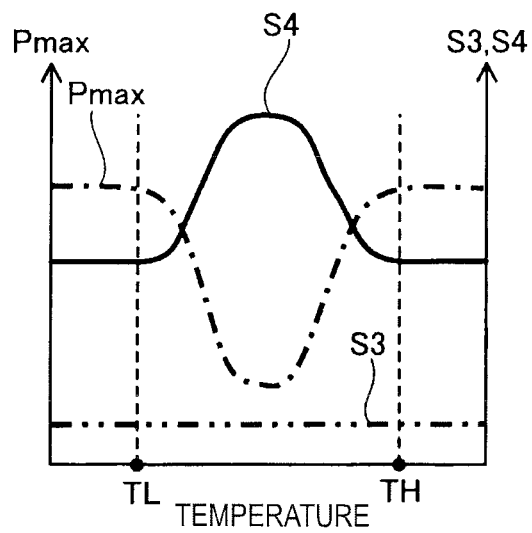
FIG. 5 is a graph showing an example of a reference setting map.

FIG. 5 is a graph showing an example of the reference setting map. In FIG. 5, the abscissa indicates the temperature, the left ordinate indicates the maximum power amount Pmax, and the right ordinate indicates the thresholds S3 and S4 of the remaining power amount. The threshold S3 (the reference value for charging of the vehicle battery 103) of the remaining power amount is constant regardless of the temperature. By contrast, the maximum power amount Pmax and the reference value S4 (the remaining power amount at which the maximum power amount Pmax is output) of the remaining power amount are values which are changed in accordance with the temperature T. More specifically, at high and low temperatures (T≥TH or T≤TL, TH is a first reference temperature and TL is a second reference temperature), the maximum power amount Pmax is large, and the threshold S4 of the remaining power amount is small. This is because, at a high or low temperature, an electric power amount which is as large as possible is supplied to the air conditioner 104 to enhance the air conditioning ability of the air conditioner 104.

In the temperature zone other than high and low temperatures (TL<T<TH, the other temperature zone), i.e., in the case where the condition of the outside air temperature is not so severe, the maximum power amount Pmax is smaller, and the threshold S4 of the remaining power amount is larger as compared with the case at a high or low temperature. This is because, in the temperature zone, the air conditioning ability of the air conditioner 104 is not required to be increased to a high level, and the air conditioner 104 is caused to operate while consuming the remaining power amount in the vehicle battery 103 as small as possible. Temperatures may be set as TH and TL in the following manner. For example, 30° C. which is the reference temperature of a hot day may be set as TH, and 0° C. which is the reference temperature of a cold day may be set as TL. The values of TH and TL may be arbitrarily set by the user, or changed in accordance with the climate of the region where the vehicle mainly travels.

Returning to the description of FIG. 2, the vehicle air conditioning system 100 calculates the supply power amount Pd to be supplied from the external power source to the air conditioner 104 (step S208). The supply power amount Pd to be supplied from the external power source to the air conditioner 104 is calculated in the following manner.

1. In the case where the supply power amount Pc to be supplied from the vehicle battery 103 to the air conditioner 104 is larger than 0 (Pc>0), the supply power amount Pd to be supplied from the external power source to the air conditioner 104 is obtained by following Expression (1):

Supply power amount *Pd* from external power source=Maximum output power amount of air conditioner 104−Supply power amount *Pc* from vehicle battery 103       (1)

2. In the case where the supply power amount Pc to be supplied from the vehicle battery 103 to the air conditioner 104 is equal to 0 (Pc=0), the remaining power amount in the vehicle battery 103 is small. Therefore, charging of the vehicle battery 103 is preferentially performed, and the residual power is set as the supply power amount Pd for the air conditioner 104. Namely, the supply power amount Pd to be supplied from the external power source to the air conditioner 104 is obtained by following Expression (2):

Supply power amount *Pd* from external power source=Rated power amount of external power source−Charging power amount to vehicle battery 103       (2)

The vehicle air conditioning system 100 sets a sum of the supply power amounts Pc and Pd which are calculated in step S207 and S208, as the maximum output power Pe of the air conditioner 104 (step S209).

Then, the vehicle air conditioning system 100 supplies the power to the air conditioner 104 based on the set maximum output to cause the pre-air conditioning function to operate (step S210), and the process of the flowchart is terminated. In the case where the power is supplied from the vehicle battery 103, the remaining power amount in the vehicle battery 103 is occasionally monitored also during the operation of the pre-air conditioning function, and the supply power amount for the air conditioner 104 is adjusted.

As described above, according to the vehicle air conditioning system 100 of the embodiment, the power supply source in pre-air conditioning can be arbitrarily selected in the air conditioner 104 which can receive power supply from a plurality of power sources (the external power source and the vehicle battery 103). Therefore, the user can arbitrarily select a power source(s) to be used, in accordance with the features and statuses of the respective power sources. More specifically, one of the three patterns, i.e., the external power source only, the vehicle battery 103 only, and both the external power source and the vehicle battery 103 can be selected as the power supply source for the air conditioner 104, and therefore an adequate power source(s) can be selected in accordance with connection/disconnection of the external power source, the remaining power amount in the vehicle battery 103, or the like.

Specifically, settings can be performed which match needs of respective users such as that, at a high or low temperature, the interior of the vehicle is ensured to be at a preset temperature by maximally utilizing the air conditioning ability of the air conditioner 104, and that the vehicle battery is charged by low-cost nighttime electric power, and the stored power is used as the power for an operation of pre-air conditioning.

According to an aspect of the invention, in a vehicle air conditioner mounted on a vehicle that can receive power supply from a plurality of power sources, a power supply source in pre-air conditioning can be arbitrarily selected, and therefore the user can arbitrarily select a power source (s) to be used, in accordance with the features and statuses of the respective power sources.

According to an aspect of the invention, one of the three patterns, i.e., the external power source only, the vehicle battery only, and both the external power source and the vehicle battery can be selected as the power supply source for the vehicle air conditioner, and therefore an adequate power source(s) can be selected in accordance with connection/disconnection of the external power source, the remaining power amount in the vehicle battery, or the like.

According to an aspect of the invention, in the case where the vehicle battery only is selected as the power supply source, the supply power amount for the vehicle air conditioner is changed in accordance with the remaining power amount in the vehicle battery, and therefore exhaustion of the vehicle battery, and the like can be prevented from occurring.

According to an aspect of the invention, in the case where both the external power source and the vehicle battery are selected as the power supply source, the power amounts to be supplied respectively from the external power source and the vehicle battery are set based on the remaining power amount in the vehicle battery, and therefore a desired air conditioning state can be efficiently realized while preventing exhaustion of the vehicle battery, and the like from occurring.

According to an aspect of the invention, the supply power amount for the vehicle air conditioner is set to a constant value, and therefore the power can be stably supplied to the vehicle air conditioner even when the remaining power amount in the vehicle battery is varied.

According to an aspect of the invention, the supply power amount from the vehicle battery is changed based on the outside air temperature, and therefore the air conditioning ability of the vehicle air conditioner can be used more efficiently.

According to an aspect of the invention, in the case where the outside air temperature is not within the predetermined temperature zone, the supply power amount from the vehicle battery is increased, and therefore a desired air conditioning state can be realized more rapidly when the temperature is extremely high or low.

According to an aspect of the invention, it is determined whether the power supply source selected by the selecting section can perform the power supply or not, and, if it is determined that the selected power supply source cannot perform the power supply, the power supply source is changed to another one. Therefore, the pre-air conditioning function is enabled to operate even when the states of the power sources are different from expectations at the time of inputting the setting.

What is claimed is:

1. A power switching apparatus, including a processor and a memory that stores a program executed by the processor, configured to switch a power supply source configured to supply an electric power to an air conditioner mounted on a vehicle that receives a power supply from a plurality of power sources, the power switching apparatus comprising:

a selecting section that allows a user to select the power supply source during execution of pre-air conditioning in which an operation of the air conditioner is started before start of running of the vehicle; and a setting section, performed by the processor, that executes the program to set a power supply to be supplied from the power supply source selected by the selecting section, to the air conditioner.

2. The power switching apparatus according to claim 1, wherein
the vehicle runs by an electric power stored in a battery, which is mounted on the vehicle, for driving, as a source of power,
the plurality of power sources include an external power source which performs the power supply from an outside of the vehicle, and the battery, and
the selecting section executes the program to select at least one of the external power source and the vehicle battery, as the power supply source.

3. The power switching apparatus according to claim 2, wherein,
in a case where the battery only is selected as the power supply source, the setting section executes the program to:
when a remaining power amount in the battery is equal to or smaller than a first reference value, the power supply to the air conditioner is not performed;
when the remaining power amount is equal to or larger than a second reference value that is larger than the first reference value, a power amount corresponding to a maximum output power amount of the air conditioner is supplied from the battery; or,
when the remaining power amount is larger than the first reference value and smaller than the second reference value, a power amount to be supplied from the battery is changed in proportion to the remaining power amount.

4. The power switching apparatus according to claim 2, wherein,
in a case where both the external power source and the battery are selected as the power supply source, the setting section executes the program to set a power amount to be supplied from the external power source and a power amount to be supplied from the battery, based on a remaining power amount in the battery.

5. The power switching apparatus according to claim 4, wherein
the setting section executes the program to set:
a sum of the power amount to be supplied from the external power source and the power amount to be supplied from the battery has a constant value; and,
when the remaining power amount is equal to or smaller than a third reference value, the power supply to the air conditioner is performed by the eternal power source only;
when the remaining power amount is equal to or larger than a fourth reference value that is larger than the third reference value, a predetermined power amount is supplied from the battery, and a difference of the constant value and the predetermined power amount is supplied from the external power source; or,
when the remaining power amount is larger than the third reference value and smaller than the fourth reference value, the power amount to be supplied from the battery is changed in proportion to the remaining power amount, and a difference of the constant value and the power amount to be supplied from the battery is supplied from the external power source.

6. The power switching apparatus according to claim 5, wherein the setting section executes the program to change the fourth reference value and the predetermined power amount, based on an outside air temperature in a vicinity of the vehicle.

7. The power switching apparatus according to claim 6, wherein, in a case where the outside air temperature is equal to or higher than a first reference temperature, or is equal to or lower than a second reference temperature which is lower than the first reference temperature, the setting section executes the program to make the fourth reference value smaller than a value in another temperature zone, and the predetermined power amount larger than a value in the another temperature zone.

8. The power switching apparatus according to claim 1, further comprising:
an acquiring section, performed by the processor, that executes the program to acquire information related to a suppliable power amount of each of the power sources, wherein
the setting section executes the program to determine whether the power supply source selected by the selecting section can perform the power supply or not, based on the information, and, if it is determined that the selected power supply source cannot perform the power supply, changes the power supply source, based on the information.

* * * * *